United States Patent Office 3,629,255
Patented Dec. 21, 1971

3,629,255
FLUOROCARBON ESTERS OF ISOCYANURATE
Wilhelmus M. Beyleveld, Whippany, Bryce C. Oxenrider, Florham Park, and Cyril Woolf, Morristown, N.J., assignors to Allied Chemical Corporation, New York, N.Y.
No Drawing. Filed Mar. 19, 1969, Ser. No. 808,681
Int. Cl. C07d 55/38
U.S. Cl. 260—248 NS     8 Claims

ABSTRACT OF THE DISCLOSURE

This invention relates to a novel class of fluorine containing isocyanurate esters derived from reacting tris(2-hydroxyethyl)isocyanurate with hereinafter defined fluoro acids, and tris(2-carboxyethyl)isocyanurate with hereinafter defined fluoro alcohols.

---

It is an object of this invention to provide a novel class of isocyanurates which are characterized by the presence of fluorocarbon ester moieties on one or more of the ring nitrogens.

Another object of this invention is to provide a process for the production of the above described isocyanurate-fluorocarbon esters.

The compounds of the invention exhibit low surface energies and thus have utility as oil and dirt repellents for textile materials.

The novel compounds of this invention have the formula:

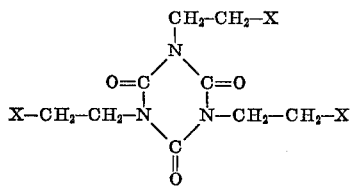

wherein, for Group I compounds X represents —$COOR_1$ and for Group II compounds X represents —$OR_2$.

Thus, the novel compounds of Group I have the formula

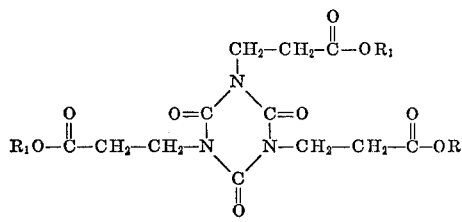

wherein each $R_1$ is independently selected from the group consisting of hydrogen and organic radicals of the formula:

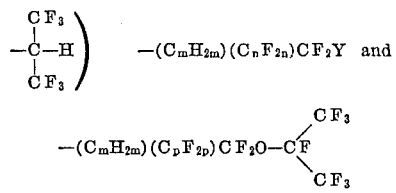

wherein $m=1$ to 10, preferably $m=1$ to 5; $n=1$ to 16, preferably $n=1$ to 9; $p=1$ to 13, preferably $p=1$ to 7, with the proviso that the total number of carbon atoms in any $R_1$ radical shall not exceed 20; Y is hydrogen, fluorine, chlorine, or bromine; and no more than two of $R_1$ are hydrogen.

The novel compounds of Group II have the formula

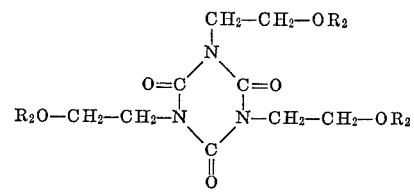

wherein each $R_2$ is independently selected from the group consisting of hydrogen and organic radicals of the formula:

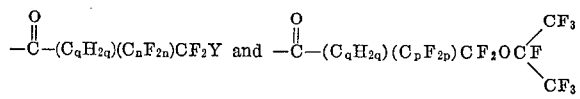

wherein $n=1$ to 16, preferably $n=1$ to 9; $p=1$ to 13, preferably $p=1$ to 7; $q=0$ to 10, preferably $q=0$ to 5, with the proviso that the total number of carbon atoms in any $R_2$ radical shall not exceed 20; Y is hydrogen, fluorine, chlorine, or bromine; and more than two of $R_2$ are hydrogen.

The novel compounds of Group I may be prepared by reacting tris(2-carboxyethyl)isocyanurate, hereinafter referred to as tris-acid, with varying amounts of a fluoro alcohol, $R_1OH$ wherein $R_1$ is defined as above and tris-acid has the formula:

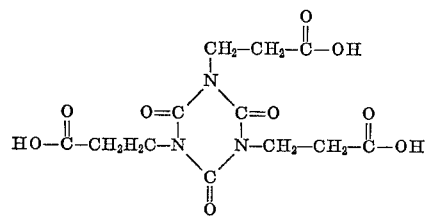

The process is preferably run under anhydrous conditions, such as under an anhydrous nitrogen atmosphere or dry air.

The tris-acid is dissolved in a slight excess of a perfluoro carboxylic acid anhydride of up to 8 carbon atoms such as trifluoroacetic anhydride or decafluoroacetyl butyrate. An additional non-reactive solvent may also be present. The acid anhydride reacts with the —COOH groups of the tris acid to form mixed anhydride groups and a fluorinated carboxylic acid. The reaction of the tris acid —COOH groups with trifluoroacetic anhydride is as follows:

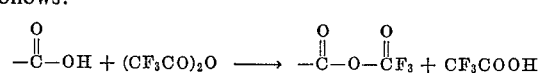

The fluoro alcohol, $R_1OH$ is then added to the solution and from about 2 to about 8 hours are allowed for the fluoro alcohol to react with the mixed anhydrides to yield the novel compounds of Group I as follows:

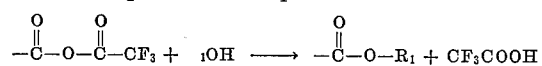

For the above reaction to produce predominantly monoesters, a molar ratio of fluoro alcohol to tris-acid of about at most 1:1 is used; to produce predominately diesters, a molar ratio of about 2:1 is used; and to produce predominately triesters, a molar ratio of about at least 3:1 is used.

The reactions of the invention may be carried out over a relatively wide range of temperatures. Reaction temperatures should be maintained below the reflux temperature of the reaction mixture so as to avoid undesirable loss of material. A minimum reaction temperature of about 20° C. is preferred, with a temperature ranging from about 60° C. to about 90° C. being especially preferred.

The process affords the advantages of operation at atmospheric pressures. However, super-atmospheric or sub-atmospheric pressure may also be employed, if desired.

After the esterification reaction is complete, the $$CF_3COOH$$

formed and any unreacted fluoro-alcohol remaining may be removed from the reaction mixture by, for example, distillation. The product is then hydrolyzed to reconvert any remaining anhydride groups to —COOH groups. Hydrolysis can be achieved by any of the conventional methods, such as the addition of water or a weak base to the reaction product.

Following hydrolysis, the product ester may be recovered by methods known to those skilled in the art. One such method being extraction with a suitable solvent which dissolves the ester and is not miscible with the medium used to hydrolyze the extraneous anhydride groups. Illustrative of such solvents is chloroform, carbon tetrachloride, ethyl ether, and the like.

When preparing the triester small amounts of mono- and diester will also be formed, and when preparing the mono- and diesters small amounts of triester will be formed. An essentially pure triester can be separated from the mono- and diesters by mixing the product residue with an aqueous hydroxide of the type which forms water soluble salts with the mono- and diesters. The soluble mono- and diester salts are separated from the insoluble triester, converted back to the mono- and diesters by, for example, treating with a suitable mineral acid, such as $H_2SO_4$ or HCl, and then recovered as an insoluble oil phase. The aqueous hydroxide used in the above procedure is preferably an alkali metal hydroxide, especially sodium or potassium hydroxide.

The various esters can also be separated from each other by such conventional methods as vacuum distillation, preparative chromatography, and recrystallization.

The novel compounds of Group II may be prepared by various methods involving the reaction of tris(2-hydroxyethyl)-isocyanurate, hereinafter referred to as tris alcohol, with varying amounts of fluoro acid, $R_2OH$, wherein $R_2$ is defined as above and the tris alcohol has the formula

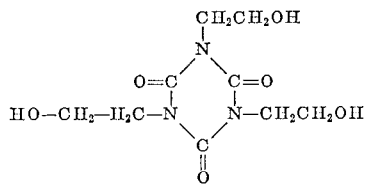

In one method, the fluoro acid and the tris alcohol are dissolved, either separately or together, in a slight excess of a perfluorocarboxylic acid anhydride of up to 8 carbon atoms, such as trifluoroacetic anhydride. Another nonreactive solvent may also be present. Reaction time is generally from about 2 hours to about 8 hours.

To produce predominantly monoesters, a molar ratio of fluoro acid to tris alcohol of about at most 1:1 is used; to produce predominantly diesters, a molar ratio of about 2:1 is used; and to produce predominantly triesters, a molar ratio of about at least 3:1 is used.

The temperature and pressure conditions for this reaction are the same as those used to produce Group I compounds.

After the esterification reaction is complete, most of the perfluorocarboxylic acid formed may be removed from the reaction mixture by, for example, distillation. The residue is then dissolved in a non-reactive solvent, such as aqueous acetone, and then neutralized with a base, such as NaOH, to pH of about 8. The solution is then evaporated to remove most of the solvent and the ester product is recovered by extraction with a suitable solvent such as chloroform, carbon tetrachloride, or ether. The extract phase is then evaporated and dried, the residue being the desired esters.

In another method of preparation, the fluoro acid and the tris alcohol are dissolved in a non-reactive organic solvent system with or without the addition of an acidic esterification catalyst. The reaction mixture is heated and refluxed in a Soxlett type extraction apparatus. The water formed in the reaction is removed by azeotropic distillation and recycling via a drying agent which is present in the thimble of the apparatus. After refluxing for about 8 hours the reaction is completed and the solvents are removed by distillation under reduced pressure. The crude ester remains as a residue and can be purified by the usual methods, such as solvent extraction, crystallization etc.

Illustrative of a non-reactive organic solvent system is diglyme or diglyme-toluene of about 4 to 1 volume ratio. The diglyme functions as a solvent while the toluene lowers the boiling point of the solvent mixture and functions as an azeotrope component with the water formed in the reaction. Other nonreactive organic solvent systems may be readily found by those skilled in the art. The commonly used esterification catalysts can be employed, such as para-toluenesulfonic acid. The fluoroacid itself may also act as catalyst. Any drying agent which is insoluble and unreactive towards the recycling solvent can be used to remove the water from the azeotrope, e.g. molecular sieve, Drierite, etc.

The invention can be more fully understood by reference to the following examples. In these examples, the surface energies were measured according to the method of Zisman, Journal of Physical Chemistry, 64, 519 (1960), said method being used to determine the ability of the fluorocarbon products to lower the surface energy of a clean glass slide. In our particular examples, a 1% weight-volume solution of the product in a volatile organic solvent, usually acetone, was poured over a clean glass microscope slide. The excess solution was allowed to run off the slide and the coated slide was then dried in an oven at 50–60° C. for about 0.5 hour to insure removal of the solvent.

EXAMPLE 1

Under an anhydrous nitrogen atmosphere, 8.7 grams (0.025 mole) of tris(2-carboxyethyl)isocyanurate were added to 20 grams (0.1 mole) of trifluoroacetic anhydride at room temperature. The solution was then slowly heated to 70° C. and held there for about 4 hours. Then 14 grams (0.083 mole) of hexafluoroisopropanol, i.e.

$$HC(CF_3)_2OH$$

were added dropwise to the solution and the temperature of the solution raised to about 77° C. and held for 3 hours. The temperature was gradually raised to 110° C. and the $CF_3COOH$ formed was distilled off. The solution was then cooled to room temperature, the residue dissolved in $CHCl_3$, and the solution extracted with water and aqueous $NaHCO_3$. The remaining $CHCl_3$ solution was dried over $MgSO_4$. The $CHCl_3$ was then removed by evaporation and the resulting residue dried at about 1 mm. Hg and 120° C. The product obtained was a white solid, melting point 60° C., in essentially 100% yield. Elemental analysis showed the following comparison with theoretical values for a triester in which $R_1$ is —$CH(CF_3)_2$:

Analysis (percent): C, 32.0; H, 2.2; N, 5.4; F, 43.3.
Theoretical (percent): C, 31.7; H, 1.9; N, 5.3; F, 43.0.

The triester structure was confirmed by infrared (IR) analysis, which showed no —COOH and very weak —OH.

The surface energy of the triester was found to be 17–20 dynes/cm.

EXAMPLE 2

Under an anhydrous atmosphere 6.9 grams (0.02 mole) of tris acid were dissolved in about 20 grams (0.06 mole) of trifluoroacetic anhydride and the solution warmed to about 80° C. Then 16.6 grams (0.04 mole) of $C_7H_{15}CH_2CH_2OH$ were added dropwise over a 2 hour period. The solution was stirred overnight (about 16 hours) at 80° C. and then heated to 150° C. under reduced pressure to remove the $CF_3COOH$ formed.

The residue was dissolved in 100 ml. of acetone, then 50 ml. $H_2O$ were added with mixing forming two immiscible phases. The oily product layer was removed and the aqueous layer extracted with $CCl_4$, the extract being combined with the oily layer. The oily layer was then evaporated in a rotary evaporator at about 100° C. and 1 mm. Hg, yielding 19.0 grams of a soft, brown product mixture.

The product mixture was dissolved in warm methanol and then cooled to −20° C. Two fractions were obtained:

Fraction I — Gms.
Soluble in cold methanol _____ 9
Fraction II
Insoluble in cold methanol _____ 10

Fraction I was contaminated with unreacted acid which was removed by dissolving Fraction I in chloroform and removing the insoluble tris acid by filtration. Evaporation of the chloroform solutions yields 8 grams of a monoester concentrate. Fraction II was dissolved in warm benezene and then cooled to 20° C. An insoluble liquid layer separated which upon drying yielded 8 gms. of a diester concentrate. On evaporation of the benzene solution there was obtained 2 gms. of a triester concentrate.

Infrared spectra were in agreement with the proposed structures. The characteristic carboxylic acid absorption in the 3000 cm.$^{-1}$ region was strong in the monoester concentrate, moderate in the diester concentrate, and very weak in the triester concentrate. Elemental analysis yielded the following for esters in which $R_1$ is $-C_2H_4C_6F_{12}CF_3$:

|  | Calculated, percent | | Found, percent | |
| --- | --- | --- | --- | --- |
|  | C | H | C | H |
| Monoester concentrate | 34.0 | 2.4 | 32.9 | 2.2 |
| Diester concentrate | 31.7 | 1.8 | 30.9 | 1.7 |
| Triester concentrate | 30.6 | 1.6 | 30.7 | 1.9 |

Surface energies of the product esters were as follows:

Dynes per cm.
Monoester concentrate _____ 15.5
Diester concentrate _____ 12.5
Triester concentrate _____ 13.0

EXAMPLE 3

A stepwise procedure was employed whereby first a monoester was prepared and then the monoester was used to prepare the di- and triesters.

(A) Preparation of monoester

To 69 grams (0.20 mole) of trisacid under an anhydrous atmosphere, were added 145 grams (0.70 mole) of trifluoroacetic anhydride and the mixture heated to 90° C. until a clear solution formed. To the solution was then added dropwise 32.8 grams (0.10 mole) of $(CF_3)_2CFOCF_2CF_2CH_2CH_2OH$ over a 3 hour period, with temperature held at 90° C. while stirring. The temperature was then raised to 150° C. over a 2 hour period to distill off trifluoroacetic acid. The mixture was then poured into chloroform and water added to hydrolyze any anhydride groups. The chloroform solution was then extracted with water, aqueous sodium bicarbonate, and again with water to remove excess acid.

The chloroform layer was dried over anhydrous $MgSO_4$. The solvents were removed from the filtered solution in a rotary evaporator at 100° C. and 1 mm. Hg.

The residue was a clear oil which became a white solid on standing and had a melting point range of 60–70° C. IR analysis showed weak OH and COOH peaks. Titration of the residue for acid required 2.58 ml./mg. whereas theoretical is 3.05 ml./mg. for the monoester.

Elemental analysis showed the following comparison with theoretical values for the monoester in which $R_1$ is $-(CH_2)_2(CF_2)_2OCF(CF_3)_2$:

Analysis (percent): C, 34.4; H, 2.83; F, 34.9. Theoretical (percent): C, 34.7; H, 2.74; F, 31.8.

Surface energy of the residue was found to be 16.5 dynes/cm.

(B) Preparation of diester and triester

Under anhydrous nitrogen atmosphere, 33 grams of the concentrated monoester (about 0.05 mole) were heated in about 30 grams (0.13 mole) of trifluoroacetic anhydride for 1 hour at 80° C. Then the solution was heated to 90° C. and 23 g. (0.07 mole) of $(CF_3)_2CFO(CF_2)_2(CH_2)_2OH$ were slowly added over a 2 hour period. The solution was kept at 90° C., while stirring for an additional 2 hours. The temperature was then raised to 140° C. to distill off the $CF_3COOH$ which formed. The residue was dissolved in chloroform and the solution extracted with water, aqueous $NaHCO_3$ solution, and again with water. The chloroform solution was dried over anhydrous $MgSO_4$, filtered and the solvents removed in a rotary evaporator at 100° C. and 1 mm. Hg.

The residue was dissolved in acetone and aqueous NaOH was added to a pH of 9 to convert the diesters (and any remaining monoesters) into their Na salts. Water was added to the solution and the 2 layers which formed were separated. The acetone layer was extracted with $CCl_4$ and the $CCl_4$ extract was evaporated yielding a yellow oil, triester concentrate. The water layer was acidified with HCl to a pH of 3 and then extracted with $CCl_4$. The $CCl_4$ extract was evaporated yielding a yellow oil, diester concentrate.

Comparison of theoretical and elemental analysis for the diesters and triesters gave the following results.

|  | C | H | F |
| --- | --- | --- | --- |
| Diester concentrate: |  |  |  |
| Theoretical | 32.2 | 2.2 | 43.2 |
| Analysis | 33.6 | 2.6 | 34.5 |
| Triester concentrate: |  |  |  |
| Theoretical | 30.9 | 1.9 | 48.9 |
| Analysis | 32.2 | 2.3 | 46.3 |

IR analysis showed the following:

Diester concentrate—strong COOH

Triester concentrate—no COOH, weak OH

Titration for acid yielded the following:

Diester concentrate—1.67 ml./100 mg. (theoretical=1.03)
Triester concentrate—0.09 ml./100 mg. (theoretical=0.0)

EXAMPLE 4

Under an anhydrous atmosphere 5.22 (0.02 mole) grams of tris(2-hydroxyethyl)isocyanurate, 18.3 grams (0.04 mole) of $C_7F_{15}(CH_2)_3COOH$, and 25 grams (0.10 mole) of trifluoroacetic anhydride were mixed together and then heated to 60° C. until a clear solution was obtained. The temperature was then raised to 130° C. to distill off the $CF_3COOH$ formed.

The reaction mixture was then cooled to room temperature and dissolved in aqueous acetone (50/50 vol.), neutralized with aqueous NaOH solution to a pH of 8, and then allowed to stand for about 18 hours at room temperature. The solution was partly evaporated to remove most of the acetone and the remaining mixture was extracted with chloroform (Extract I) and then with ether (Extract II). Both extracts were then dried and evaporated and their residues vacuum dried at 150° C. to constant weight.

The residue of Extract I gave about 1 gram of a white solid substance having a melting point range of 74–76° C. The residue of Extract II gave about 2.5 grams of a white solid substance having a melting point range of 73–76° C. IR analysis of both residues gave similar results: no COOH and some OH.

Elemental analysis of both residues gave the following results for esters in which $R_2$ is $-(O)C(CH_2)_3(CF_2)_6CF_3$:

|  | C | H | F |
|---|---|---|---|
| Extract II (diester concentrate): | | | |
| Theoretical | 32.8 | 2.20 | 50.2 |
| Analysis | 32.7 | 2.62 | 52.1 |
| Extract I (triester concentrate): | | | |
| Theoretical | 32.0 | 1.91 | 54.3 |
| Analysis | 32.5 | 2.32 | 55.7 |

NMR analysis was consistent with the proposed structures. The surface energies of both the diester and the triester was found to be 14 dynes/cm.

EXAMPLE 5

In a flask containing 200 ml. of anhydrous diglyme solvent, 13.0 grams (0.05 mole) of tris (2-hydroxyethyl)isocyanurate; 12.4 grams (0.025 mole) of i-$C_3F_7OCF_2CF_2CF_2CF_2CH_2CH_2COOH$ and 0.5 gram of p-toluene sulfonic acid were added. Upon heating this reaction mixture to 100° C. a clear solution was obtained. Then 50 ml. of toluene were added to the solution and the reaction flask connected to a Soxlett type extraction apparatus which is equipped with a thimble containing 20 grams of molecular sieve (Linde type No. 4A). The reaction mixture was heated to 145° C. and reflux of a toluene-water azeotrope occurred. This azeotrope passed through the drying agent before returning into the reaction flask. The mixture was refluxed for 8 hours and then cooled and the solvents removed by distillation under reduced pressure. The crude product residue was purified as follows:

Treatment with 50 ml. acetone dissolved the ester product while the unreacted tris alcohol remained insoluble and was removed by filtration. The ester product was separated from the acetone solution by dilution with an excess of n-hexane. The ester product separated as a heavy oily layer which was finally dried by heating at 100° C. in a rotary evaporator under vacuum. The product was a yellow soft solid or viscous oil, yield 90%. The structure was confirmed by infrared and NMR analysis.

Elemental analysis gave the following results for a monoester in which $R_2$ is $$-(O)C(CH_2)_2(CF_2)_4OCF(CF_3)_2$$

*Analysis* (percent): C, 35.3; H, 3.32; N, 6.43; F, 34.6.
Theoretical (percent): C, 32.5; H, 2.57; N, 6.0; F, 40.7.

EXAMPLE 6

The procedure of Example 3 is repeated using the following fluoroalcohols to make the corresponding mono-, di-, and triesters of tris(2-carboxy ethyl) isocyanurate $(CF_3)_2CFOCF_2C_{13}F_{26}C_2H_4OH$ $(CF_3)_2CFOCF_2C_4F_8C_{10}H_{20}OH$ $(CF_3)_2CFOCF_2CF_2CH_2OH$ $(CF_3)_2CFOCF_2C_7F_{14}C_5H_{10}OH$

EXAMPLE 7

The procedure of Example 2 is repeated using the following fluoroalcohols to make the corresponding mono-, di-, and triesters of tris(2-carboxy ethyl)isocyanurate.

$CF_3C_{16}F_{32}C_2H_4OH$ $CF_2HC_9F_{18}C_{10}H_{20}OH$ $CF_2ClCF_2C_5H_{10}OH$ $CF_2BrC_2F_4CH_2OH$

EXAMPLE 8

The procedure of Example 4 was repeated using the following fluoroacids to make the corresponding mono-, di-, and triesters of tris(2-hydroxy ethyl) isocyanurate.

$CF_3C_{16}F_{32}C_2H_4COOH$ $CF_2HC_9F_{18}C_5H_{10}COOH$ $CF_2ClC_5F_{10}COOH$ $CF_2BrCF_2CH_2COOH$ $(CF_3)_2CFOCF_2C_{13}F_{26}C_2H_4COOH$ $(CF_3)_2CFOCF_2C_4F_8C_{10}H_{20}COOH$ $(CF_3)_2CFOCF_2C_9F_{18}C_5H_{10}COOH$ $(CF_3)_2CFOCF_2CF_2COOH$

We claim:

1. A compound of the formula:

$$\begin{array}{c} CH_2-CH_2-X \\ | \\ N \\ O=C \diagup \diagdown C=O \\ | \quad\quad | \\ X-CH_2-CH_2-N \quad\quad N-CH_2-CH_2-X \\ \diagdown \diagup \\ C \\ \| \\ O \end{array}$$

wherein X represents $-COOR_1$ or $-OR_2$, each $R_1$ being a radical independently selected from the group consisting of hydrogen $-CH(CF_3)_2$, $-(C_mH_{2m})(C_nF_{2n})CF_2Y$, and $-(C_mH_{2m})(C_pF_{2p})CF_2OCF(CF_3)_2$, with no more than two of the $R_1$ radicals being hydrogen; each $R_2$ being a radical independently selected from the group consisting of hydrogen $-(O)C(C_qH_{2q})(C_nF_{2n})(CF_2Y)$ and $$-(O)C(C_qH_{2q})(C_pF_{2p})CF_2OCF(CF_3)_2$$

with no more than two of the $R_2$ radicals being hydrogen; wherein $m=1$ to 10, $n=1$ to 16, $p=1$ to 13, $q=0$ to 10, with the proviso that the total number of carbon atoms in any $R_1$ or $R_2$ radical shall not exceed 20; and Y is a radical selected from the group consisting of hydrogen, fluorine, chlorine, and bromine.

2. The compound of claim 1 wherein X represents $-COOR_1$, $m=1$ to 5, $n=1$ to 9, and $p=1$ to 7.

3. The compound of claim 1, wherein X represents $-OR_2$ and $n=1$ to 9, $p=1$ to 7, and $q=0$ to 5.

4. The compound of claim 2 wherein each $R_1$ is independently hydrogen or $-(CH_2)_2(CF_2)_2OCF(CF_3)_2$, with not more than 2 of the $R_1$ radicals being hydrogen.

5. The compound of claim 2 wherein each $R_1$ is independently hydrogen or $-(CH_2)_2(CF_2)_6CF_3$ with not more than 2 of the $R_1$ radicals being hydrogen.

6. The compound of claim 2, wherein one $R_1$ is hydrogen and the remaining two $R_1$ radicals are $$-(CH_2)_2(CF_2)_6OCF(CF_3)_2$$

7. The compound of claim 2, wherein each $R_1$ radical is $-CH(CF_3)_2$.

8. The compound of claim 3, wherein each $R_2$ is independently hydrogen or $-(O)C(CH_2)_3(CF_2)_6CF_3$, with not more than one of the $R_2$ radicals being hydrogen.

References Cited
UNITED STATES PATENTS 3,485,833  12/1969  Sadle _____ 260—248

JOHN M. FORD, Primary Examiner

U.S. Cl. X.R.

117—138.5; 252—8.8